(12) United States Patent
Harada et al.

(10) Patent No.: US 8,386,871 B2
(45) Date of Patent: Feb. 26, 2013

(54) RETRANSMISSION CONTROL METHOD AND RECEIVING SIDE APPARATUS

(75) Inventors: Atsushi Harada, Kawasaki (JP); Hiroyuki Ishii, Yokosuka (JP); Anil Umesh, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 770 days.

(21) Appl. No.: 12/526,454

(22) PCT Filed: Feb. 8, 2008

(86) PCT No.: PCT/JP2008/052198
§ 371 (c)(1), (2), (4) Date: Oct. 5, 2009

(87) PCT Pub. No.: WO2008/096878
PCT Pub. Date: Aug. 14, 2008

(65) Prior Publication Data
US 2010/0153803 A1    Jun. 17, 2010

(30) Foreign Application Priority Data
Feb. 9, 2007   (JP) ................. P2007-031384

(51) Int. Cl.
*G08C 25/02* (2006.01)
*H04L 1/18* (2006.01)
*H04L 1/14* (2006.01)

(52) U.S. Cl. .................. 714/748; 714/749; 714/750

(58) Field of Classification Search ........... 714/748–750
See application file for complete search history.

(56) References Cited

U.S. PATENT DOCUMENTS

| | | | |
|---|---|---|---|
| 7,447,968 B2 | 11/2008 | Ha et al. | |
| 7,499,434 B2 * | 3/2009 | Cheng et al. | 370/336 |
| 7,526,304 B2 * | 4/2009 | Bachl et al. | 455/515 |
| 7,668,192 B2 * | 2/2010 | Malkamaki et al. | 370/455 |
| 7,715,349 B2 * | 5/2010 | Bachl et al. | 370/335 |
| 8,125,947 B2 * | 2/2012 | Bachl et al. | 370/329 |
| 8,155,687 B2 * | 4/2012 | Englund et al. | 455/522 |

(Continued)

FOREIGN PATENT DOCUMENTS

| | | |
|---|---|---|
| CN | 1820443 A | 8/2006 |
| JP | 2005-151575 A | 6/2005 |

(Continued)

OTHER PUBLICATIONS

3GPP TS 25.321 V6.11.0 (Dec. 2006) 3rd Generation Partnership Project (3GPP); Technical Specification Group Radio Access Network; Medium Access Control (MAC) protocol specification (Release 6).*

(Continued)

*Primary Examiner* — Joseph D Torres
(74) *Attorney, Agent, or Firm* — Osha Liang LLP

(57) ABSTRACT

A retransmission control method involving a physical control channel transmitting step of transmitting, at a transmitting side apparatus, a new data indicator updated upon transmission of a new packet, and a retransmission sequence number indicating whether transmission is first transmission or retransmission, through a physical control channel associated with a physical data channel, and a transmission acknowledgement information transmitting step of transmitting, at a receiving side apparatus, transmission acknowledgment information on a packet received through the physical data channel, on the basis of the new data indicator and the retransmission sequence number received through the physical control channel.

5 Claims, 13 Drawing Sheets

U.S. PATENT DOCUMENTS

| | | | |
|---|---|---|---|
| 2007/0047437 A1* | 3/2007 | Bachl et al. | 370/229 |
| 2007/0115894 A1 | 5/2007 | Herrmann et al. | |
| 2007/0121554 A1* | 5/2007 | Luo et al. | 370/335 |
| 2007/0133458 A1* | 6/2007 | Chandra et al. | 370/329 |

FOREIGN PATENT DOCUMENTS

| | | | |
|---|---|---|---|
| JP | 2005-523669 A | 8/2005 | |
| WO | 2005/006640 A1 | 1/2005 | |

OTHER PUBLICATIONS

Qualcomm Europe, "Impact of CFN based RV Detection on E-TFICH Performance," 3GPP TSG-RAN WG1#38-bis R1-041249, Sep. 2004, p. 1 [retrieved on Apr. 11, 2008] Retrieved from the Internet:<URL:http://www.3gpp.org/ftp/tsg_ran/WG1_RL1/TSGR1_38bis/Docs/R1-041249.zip>, 3 pages.

ASUSTeK, "Recognition and handling of new transmission and retransmission with Bit Correlation at HARQ level," 3GPP TSG-RAN WG2 ON LTE R2-061906, Jun. 2006, p. 1 [retrieved on Apr. 14, 2008]. Retrieved from the Internet:<URL:http://www.3gpp.org/ftp/tsg_ran/WG2_RL2/TSGR2_AHs/2006_06_LTE/Docs/R2-061906.zip>, 5 pages.

ASUSTeK, "Handling of DTX to ACK error in HSDPA," 3GPP TSG-RAN WG2#54 R2-062406, Aug. 2006, p. 1-3 [retrieved on Apr. 14, 2008]. Retrieved from the Internet:<URL:http://www.3gpp.org/ftp/tsg_ran/WG2_RL2/TSGR2_54/Documents/R2-062406.zip>, 7 pages.

3GPP TS 25.308 V7.1.0 (Dec. 2006), "High Speed Downlink Packet Access (HSDPA)," Overall description, Stage 2 (Release 7), 34 pages.

International Search Report issued in PCT/JP2008/052198, mailed on Apr. 22, 2008, with translation, 5 pages.

Written Opinion issued in PCT/JP2008/052198, mailed on Apr. 22, 2008, 4 pages.

Office Action for Chinese Patent Application No. 200880004550.3, issued May 3, 2012, with English translation thereof (10 pages).

Office Action for Japanese Patent Application No. 2008-557182 mailed Oct. 23, 2012, with English translation thereof (7 pages).

* cited by examiner

RETRANSMISSION CONTROL METHOD AND RECEIVING SIDE APPARATUS

TECHNICAL FIELD

The present invention relates to a retransmission control method and receiving side apparatus with which a retransmission control for a packet transmitted from a transmitting side apparatus to the receiving side apparatus through a physical data channel is performed on the basis of transmission acknowledgement information on the packet.

BACKGROUND ART

Heretofore, an HSDPA (High Speed Downlink Packet Access) mobile communication system has been known as a mobile communication system in which a retransmission control is performed (see Non-Patent Document 1, for example).

With reference to FIG. 1 to FIG. 7, a description will be given of the retransmission control in the conventional HSDPA mobile communication system.

The retransmission control in the HSDPA mobile communication system having the configuration shown in FIG. 1 is implemented by an "HARQ (Hybrid Automatic Repeat reQuest) retransmission control" in an MAC-hs layer and an "ARQ retransmission control" in an RLC layer.

In this HSDPA mobile communication system, the ARQ retransmission control in the RLC layer is configured to ultimately compensate for a packet reception error and a packet decoding error which cannot be compensated in the MAC-hs layer. Moreover, in the HSDPA mobile communication system, the ARQ retransmission control in the RLC layer is configured to ultimately compensate for missing (loss) of a packet due to, for example, a false detection of transmission acknowledgement information (ACK/NACK) in the HARQ retransmission control (for example, a mobile station falsely detects an ACK as being an NACK, or a mobile station falsely detects reception of an ACK from a mobile station actually in a DTX state).

With reference to FIG. 2A to FIG. 2F, a specific description will be given of the retransmission control in the HSDPA mobile communication system. Hereinbelow, the description will be given under the assumption that a single HARQ process is performed. In addition, a "TSN (Transmission Sequence Number)" assigned to each packet cyclically takes a value from 0 to 15.

In FIG. 2A, an MAC-hs layer of a receiving side apparatus (mobile station) 30 successfully receives and decodes a packet "TSN=15". Accordingly, the MAC-hs layer stores the packet "TSN=15" in a sequence control buffer 35, and concurrently extracts a packet "TSN=10" from the sequence control buffer 35 and then the MAC-hs layer forwards the extracted packet to an RLC layer. Then, the "TSN" of the packet which the receiving side apparatus 30 expects to receive next is set at "0".

In FIG. 2B, however, the packet "TSN=0" is lost in the MAC-hs layer of the receiving side apparatus 30, because of any of the above-mentioned errors (such as reception error, decoding error, and false detection). Accordingly, although the "TSN" of the packet which the receiving side apparatus 30 expects to receive next remains at "0", a transmitting side apparatus (base station) 10 transmits a packet "TSN=1" to the receiving side apparatus 30 since the transmitting side apparatus 10 has not received an NACK for the packet "TSN=0".

Thereafter, the MAC-hs layer of the receiving side apparatus 30 successfully receives and decodes the packet "TSN=1". Accordingly, the MAC-hs layer stores the packet "TSN=1" in the sequence control buffer 35, and concurrently extracts a packet "TSN=12" from the sequence control buffer 35 and then forwards the extracted packet to the RLC layer.

Then, the same operation is repeated in FIG. 2C to FIG. 2E. Meanwhile, the "TSN" of the packet which the receiving side apparatus 30 expects to receive next remains at "0".

Thereafter, in FIG. 2F, the MAC-hs layer of the receiving side apparatus 30 successfully receives and decodes a packet "TSN=5". Accordingly, the MAC-hs layer stores the packet "TSN=5" in the sequence control buffer 35.

At this time, the MAC-hs layer of the receiving side apparatus 30 attempts to extract the packet "TSN=0" from the sequence control buffer 35 so as to pass the packet "TSN=0" to the RLC layer, but fails to extract the packet "TSN=0" since the packet "TSN=0" is not stored in the sequence control buffer 35.

Consequently, an ARQ entity 36 of the RLC layer detects the missing (loss) of the packet "TSN=0", and requests the transmitting side apparatus 10 to retransmit the packet "TSN=0" by the ARQ retransmission control.

As shown in FIG. 1, in the HSDPA mobile communication system, the base station is configured to transmit L1/L2 control information shown in FIG. 3 to the mobile station through an "HS-SCCH (High Speed Shared Control Channel)" as a shared physical control channel for transmitting the L1/L2 control information, and to transmit a packet to the mobile station through an "HS-PDSCH (High Speed Physical Downlink Shared Channel)" as a shared physical data channel.

Here, as shown in FIG. 3, the HS-SCCH is associated with the HS-PDSCH. The mobile station is configured to receive a packet included in the HS-PDSCH associated with the received HS-SCCH, on the basis of the L1/L2 control information included in the HS-SCCH.

Moreover, in the HSDPA mobile communication system, an "HS-DSCH (High Speed Downlink Shared Channel)" is configured to be multiplexed on the HS-PDSCH, as a transport channel.

Moreover, in the HSDPA mobile communication system, a single protocol data unit ("MAC-hs PDU") (hereinafter referred to as a packet) is configured to be transmitted at each TTI (Transmission Time Interval) of the HS-DSCH. Note that the "TSN" of each packet is included in the header portion of the packet.

Moreover, in the HSDPA mobile communication system, the mobile station is configured to determine whether or not each TTI of the HS-DSCH is assigned to the mobile station itself, on the basis of a "UE identity (16 bits)" included in the L1/L2 control information (see FIG. 4) received through the HS-SCCH.

Then, when the TTI of the HS-DSCH is assigned to the mobile station itself, the mobile station is configured to determine whether or not a packet to be transmitted at the TTI is a new packet or a retransmission packet, on the basis of an "NDI (New Data Indicator (1 bit))" in the L1/L2 control information (see FIG. 4). According to the determination result, the mobile station is configured to perform the HARQ retransmission control in the MAC-hs layer.

Here, the "NDI" used in the conventional HSDPA mobile communication system is configured of 1 bit, and is configured to be updated when a new packet is transmitted. Specifically, the "NDI" is configured to take two values alternately, for example, "0"→"1".

Non-Patent Document 1: 3GPP T525.308

DISCLOSURE OF THE INVENTION

With reference to FIG. 5 and FIG. 6, descriptions will be given of the conventional HSDPA mobile communication system in cases where an "NDI=1" which is notified from the HS-SCCH is not consistent with an "Expecting NDI=0" which the receiving side apparatus 30 expects to receive next.

As causes of the above-described inconsistency, the following three cases are assumed.

Case (A) in which the transmitting side apparatus 10 falsely detects an NACK as being an ACK for the packet "TSN=N", and transmits a new packet (TSN=N+1) to the receiving side apparatus 30.

Case (B) in which the transmitting side apparatus 10 falsely detects reception of an ACK for the packet "TSN=N", and transmits a new packet (TSN=N+1) to the receiving side apparatus 30, even when the receiving side apparatus 30 is actually in the DTX state.

Case (C) in which the transmitting side apparatus 10 falsely detects an ACK as being an NACK for the packet "TSN=N", and retransmits the packet "TSN=N" to the receiving side apparatus 30.

Firstly, Case (A) will be described with reference to FIG. 5.

As shown in FIG. 5, when failing to perform reception processing (decoding processing) of the packet "TSN=N", the receiving side apparatus 30 transmits transmission acknowledgement information, for example, an NACK, for the packet "TSN=N" (decoding result of the packet "TSN=N") through a dedicated physical control channel (HS-DPCCH: High Speed Dedicated Physical Control Channel) (HARQ feedback physical channel).

Here, when the transmitting side apparatus 10 falsely determines that an ACK for the packet "TSN=N" is received through the HARQ feedback physical channel, although the receiving side apparatus 30 has actually transmitted an NACK due to a poor condition of a radio propagation path, the transmitting side apparatus 10 transmits a packet "TSN=N+1" as a new packet to the receiving side apparatus 30. Thus, the packet "TSN=N" is lost in the receiving side apparatus 30.

Moreover, the receiving side apparatus 30 determines whether a packet transmitted through the HS-PDSCH associated with the HS-SCCH is a new packet or a retransmission packet, on the basis of the "NDI" transmitted from the transmitting side apparatus 10 through the HS-SCCH.

However, in such a case, the "NDI=1" which is notified from the transmitting side apparatus 10 through the HS-SCCH is not consistent with the "Expecting NDI=0" which the receiving side apparatus 30 expects to receive next.

Secondly, Case (B) will be described with reference to FIG. 6.

As shown in FIG. 6, when failing to perform reception processing (decoding processing) of L1/L2 control information transmitted through the HS-SCCH associated with the HS-PDSCH for transmitting the packet "TSN=N", the receiving side apparatus 30 cannot determine whether or not the packet is transmitted to the mobile station itself.

Accordingly, the receiving side apparatus 30 cannot decode the packet "TSN=N" which is transmitted through the HS-PDSCH following the HS-SCCH.

For this reason, the receiving side apparatus 30 cannot transmit transmission acknowledgement information, for example, an ACK/NACK, for the packet "TSN=N" (decoding result of the packet "TSN=N") through the HS-DPCCH (HARQ feedback physical channel). Hence, the receiving side apparatus 30 enters no-transmission operation called the "DTX: Discontinuous Transmission".

Here, when the transmitting side apparatus 10 falsely determines that an ACK for the packet "TSN=N" is received through the HARQ feedback physical channel although the receiving side apparatus 30 is actually in the DTX (no-transmission) state due to a poor condition of the radio propagation path, the transmitting side apparatus 10 transmits a packet "TSN=N+1" as a new packet to the receiving side apparatus 30. Thus, the packet "TSN=N" is lost in the receiving side apparatus 30.

Moreover, in this case, the "NDI=1" which is notified from the transmitting side apparatus 10 through the HS-SCCH is not consistent with the "Expecting NDI=0" which the receiving side apparatus 30 expects to receive next.

Thirdly, Case (C) will be described with reference to FIG. 7.

As shown in FIG. 7, when successfully performing the reception processing (decoding processing) of the packet "TSN=N", the receiving side apparatus 30 transmits transmission acknowledgement information, for example, an ACK, for the packet "TSN=N" (decoding result of the packet "TSN=N") through the HS-DPCCH (HARQ feedback physical channel).

Here, when the transmitting side apparatus 10 falsely determines that an NACK for the packet "TSN=N" is received through the HARQ feedback physical channel although the receiving side apparatus 30 has actually transmitted an ACK due to a poor condition of the radio propagation path, the transmitting side apparatus 10 retransmits the packet "TSN=N" as a retransmission packet to the receiving side apparatus 30. Thus, the receiving side apparatus 30 receives the packet "TSN=N" twice.

Moreover, the "NDI=0" which is notified from the transmitting side apparatus 10 through the HS-SCCH is not consistent with the "Expecting NDI=1" which the receiving side apparatus 30 expects to receive next.

In addition, in the conventional HSDPA mobile communication system, the receiving side apparatus 30 can only transmit any one of an ACK and an NACK as a transmission acknowledgment signal through the HARQ feedback physical channel.

Accordingly, in above-described Cases (A) and (B), even when the receiving side apparatus 30 decodes the packet "TSN=N+1" transmitted through the HS-PDSCH and notifies the transmitting side apparatus 10 of an ACK or an NACK on the basis of the decoding result, the transmitting side apparatus 10 cannot retransmit the packet "TSN=N". Thus, the packet "TSN=N" is lost in the receiving side apparatus 30.

The packet "TSN=N" thus lost in the receiving side apparatus 30 is compensated by the ARQ retransmission control in the RLC layer.

However, when the RLC layer detects a packet loss due to false detection of transmission acknowledgment information transmitted through the HARQ feedback physical channel and performs the retransmission control for the packet as described above, the RLC layer is triggered by a reception status report of the RLC layer (STATUS REPORT) transmitted regularly, or an expiry of a timer set for waiting for transmission acknowledgement information for the packet.

Accordingly, there has been a problem that detecting a loss of packet generally takes several tens of milliseconds, which increases a transmission delay.

The present invention has been made in view of the above-described problem, and has an object of providing a retransmission control method and a receiving side apparatus with which a loss of a packet is promptly detected and a retransmission control is performed, when transmission acknowledgment information transmitted through an HARQ feedback physical channel is falsely detected by a transmitting side apparatus.

A first aspect of the present invention is summarized as a retransmission control method for performing a retransmission control for a packet transmitted from a transmitting side apparatus to a receiving side apparatus through a physical data channel, on the basis of transmission acknowledgment information on the packet, the retransmission control method including: a physical control channel transmitting step of transmitting, at the transmitting side apparatus, a new data indicator updated upon transmission of a new packet, and a retransmission sequence number indicating whether transmission is first transmission or retransmission, through a physical control channel associated with the physical data channel; and a transmission acknowledgement information transmitting step of transmitting, at the receiving side apparatus, the transmission acknowledgment information on the packet received through the physical data channel, on the basis of the new data indicator and the retransmission sequence number received through the physical control channel.

In the first aspect, in the transmission acknowledgement information transmitting step, when the receiving side apparatus has transmitted the transmission acknowledgement information indicating a success of reception of a packet in a last transmission opportunity, when the new data indicator received through the physical control channel in a current transmission opportunity is different from that expected to be received next, and when the retransmission sequence number indicates first transmission, the receiving side apparatus can transmit the transmission acknowledgement information indicating a request for retransmission of a lost packet.

In the first aspect, in the transmission acknowledgement information transmitting step, when the receiving side apparatus has transmitted the transmission acknowledgement information indicating a success of reception of a packet in a last transmission opportunity, when the new data indicator received through the physical control channel in a current transmission opportunity is different from that expected to be received next, and when the retransmission sequence number indicates retransmission, the receiving side apparatus can transmit the transmission acknowledgement information indicating a success of reception of the packet.

In the first aspect, in the transmission acknowledgement information transmitting step, when the receiving side apparatus has transmitted the transmission acknowledgement information indicating a failure of reception of a packet in a last transmission opportunity, when the new data indicator received through the physical control channel in a current transmission opportunity is identical to that expected to be received next, and when the retransmission sequence number indicates first transmission, the receiving side apparatus can transmit the transmission acknowledgement information indicating a reception result of the packet.

In the first aspect, in the transmission acknowledgement information transmitting step, when the receiving side apparatus has transmitted the transmission acknowledgement information indicating a failure of reception of a packet in a last transmission opportunity, and when the new data indicator received through the physical control channel in a current transmission opportunity is different from that expected to be received next, the receiving side apparatus can transmit the transmission acknowledgement information indicating a request for retransmission of a lost packet.

In the first aspect, the last transmission opportunity and the current transmission opportunity can be assigned to the same HARQ process.

A second aspect of the present invention is summarized as a receiving side apparatus including: a physical control channel receiver unit configured to receive a physical control channel which includes a new data indicator updated upon transmission of a new packet and a retransmission sequence number indicating whether transmission is first transmission or retransmission; a physical data channel receiver unit configured to receive a physical data channel associated with the physical control channel; and a transmission acknowledgment information transmitter unit configured to transmit transmission acknowledgment information on a packet received through the physical data channel, on the basis of the new data indicator and the retransmission sequence number received through the physical control channel.

In the second aspect, when the receiving side apparatus has transmitted the transmission acknowledgement information indicating a success of reception of a packet in a last transmission opportunity, when the new data indicator received in a current transmission opportunity is different from that expected to be received next, and when the retransmission sequence number indicates first transmission, the transmission acknowledgement information transmitter unit can be configured to transmit the transmission acknowledgement information indicating a request for retransmission of a lost packet.

In the second aspect, when the receiving side apparatus has transmitted the transmission acknowledgement information indicating a success of reception of a packet in a last transmission opportunity, when the new data indicator received in a current transmission opportunity is different from that expected to be received next, and when the retransmission sequence number indicates retransmission, the transmission acknowledgement information transmitter unit can be configured to transmit the transmission acknowledgement information indicating a success of reception of the packet.

In the second aspect, when the receiving side apparatus has transmitted the transmission acknowledgement information indicating a failure of reception of a packet in a last transmission opportunity, when the new data indicator received in a current transmission opportunity is identical to that expected to be received next, and when the retransmission sequence number indicates first transmission, the transmission acknowledgement information transmitter unit can be configured to transmit the transmission acknowledgement information indicating a reception result of the packet.

In the second aspect, when the receiving side apparatus has transmitted the transmission acknowledgement information indicating a failure of reception of a packet in a last transmission opportunity, and when the new data indicator received in a current transmission opportunity is different from that expected to be received next, the transmission acknowledgement information transmitter unit can be configured to transmit the transmission acknowledgement information indicating a request for retransmission of a lost packet.

In the second aspect, the last transmission opportunity and the current transmission opportunity can be assigned to the same HARQ process.

As described above, the present invention can provide a retransmission control method and a receiving side apparatus with which a loss of a packet is promptly detected and a retransmission control is performed, when transmission acknowledgment information transmitted through an HARQ feedback physical channel is falsely detected by a transmitting side apparatus.

BEST MODES FOR CARRYING OUT THE INVENTION

Mobile Communication System according to First Embodiment of Present Invention

A configuration of a mobile communication system according to a first embodiment of the present invention will be described with reference to FIG. 8 and FIG. 9.

The mobile communication system according to this embodiment is configured to perform a retransmission control of a packet transmitted from a transmitting side apparatus 10 to a receiving side apparatus 30 through a physical data channel, on the basis of transmission acknowledgment information (ACK/NACK/DTX state) on the packet.

Here, an "HS-PDSCH" is assumed as an example of the physical data channel (shared physical data channel); an "HS-SCCH" is assumed as an example of a physical control channel (shared physical control channel); an "HS-DSCH" is assumed as an example of a transport channel multiplexed on the HS-PDSCH; an "MAC-hs PDU" is assumed as an example of a protocol data unit (packet) transmitted through the HS-DSCH. However, the present invention is not limited to these examples.

Moreover, the transmitting side apparatus, 10 and the receiving side apparatus 30 according to the present invention are assumed to be applicable to both downlink communication (a case in which the transmitting side apparatus 10 is a base station and the receiving side apparatus 30 is a mobile station) and uplink communication (a case in which the transmitting side apparatus 10 is a mobile station and the receiving side apparatus 30 is a base station).

Figure 1:
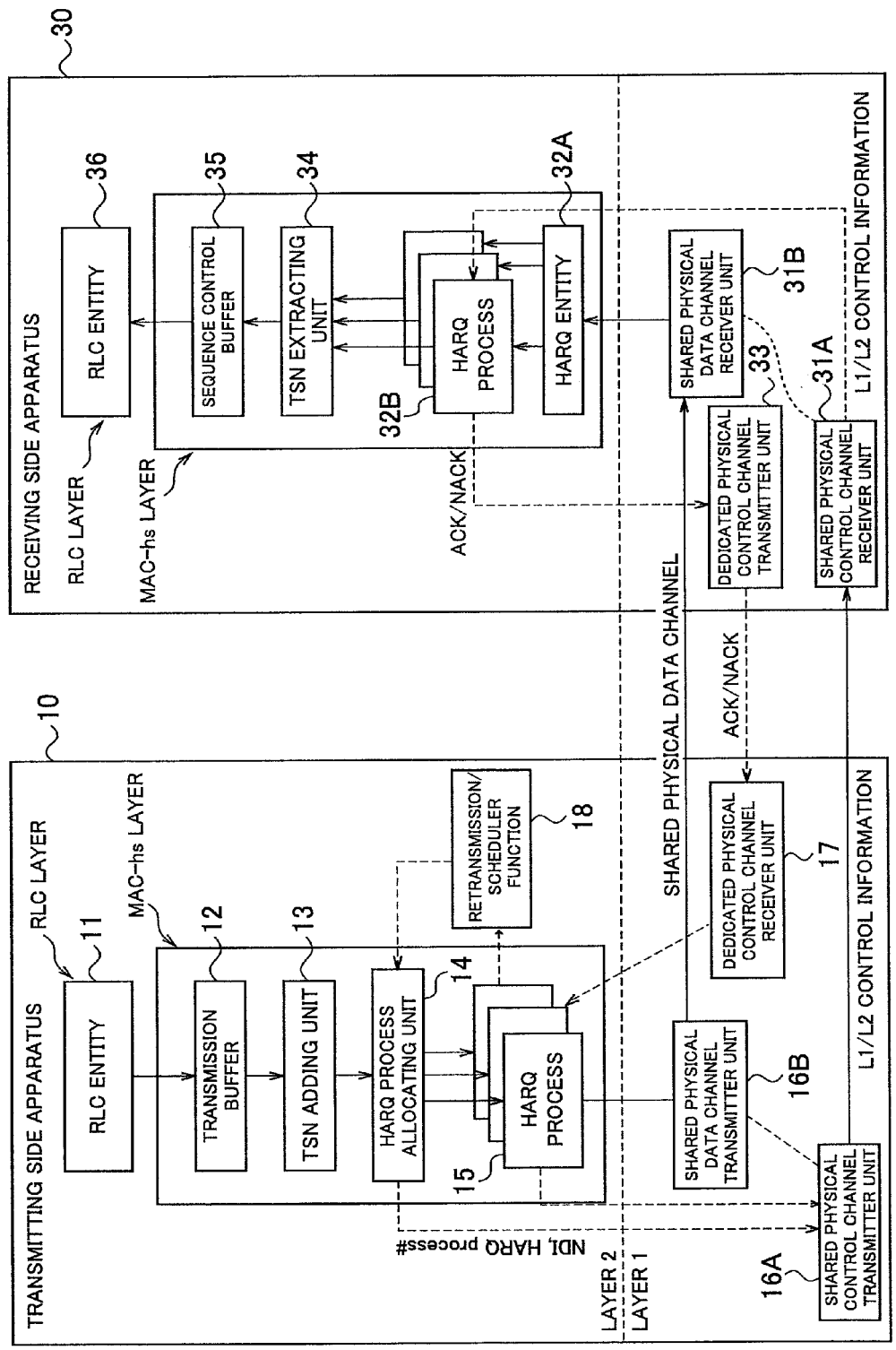
FIG. 1 is a functional block diagram of a transmitting side apparatus and a receiving side apparatus according to a conventional technique.
Figure 2A:
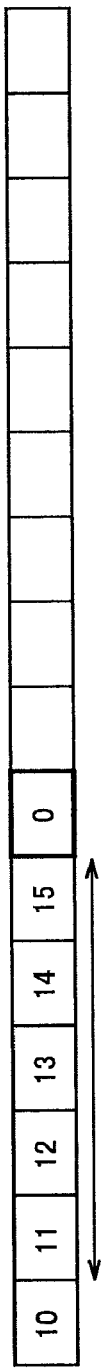
FIG. 2 is a diagram for explaining a state of a retransmission control in a mobile communication system according to the conventional technique.
Figure 2B:
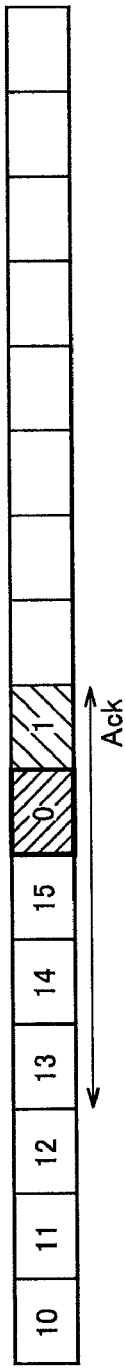
Figure 2C:
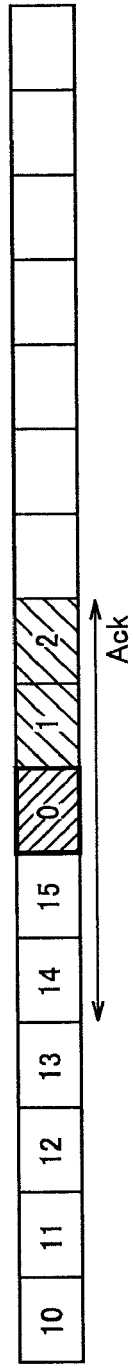
Figure 2D:
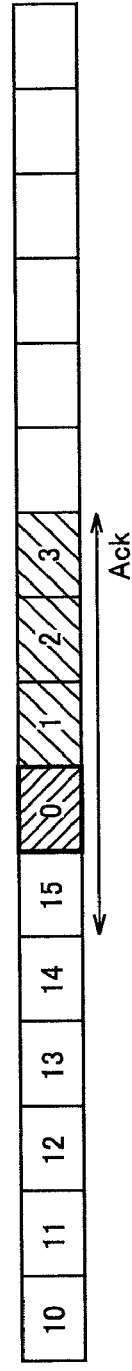
Figure 2E:
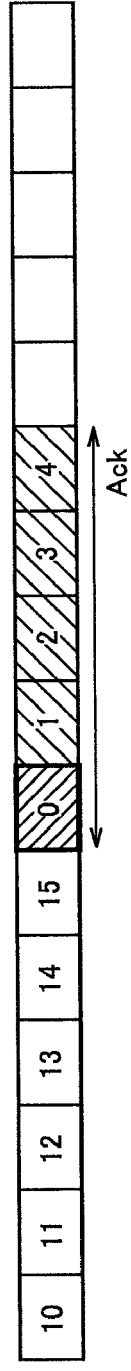
Figure 2F:
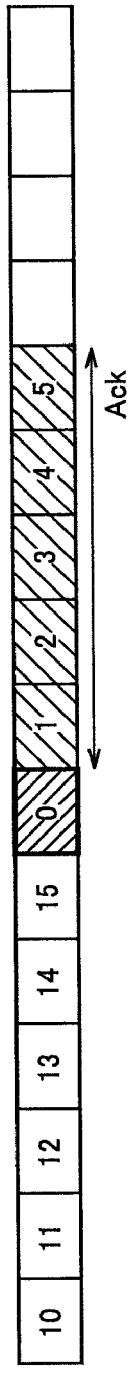
Figure 3:
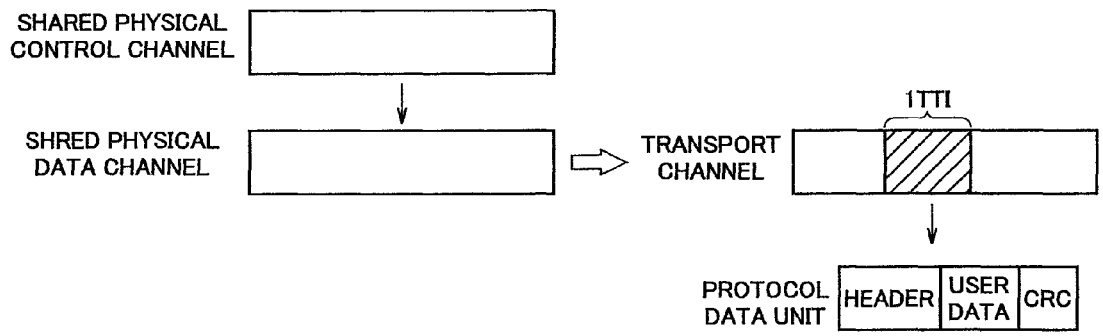
FIG. 3 is a diagram showing a channel configuration used in the mobile communication system according to the conventional technique.
Figure 4:
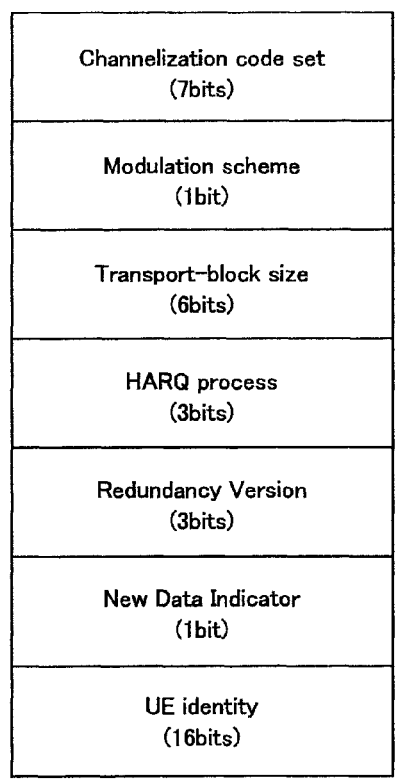
FIG. 4 is a diagram showing a format of a shared physical control channel used in the mobile communication system according to the conventional technique.
Figure 5:
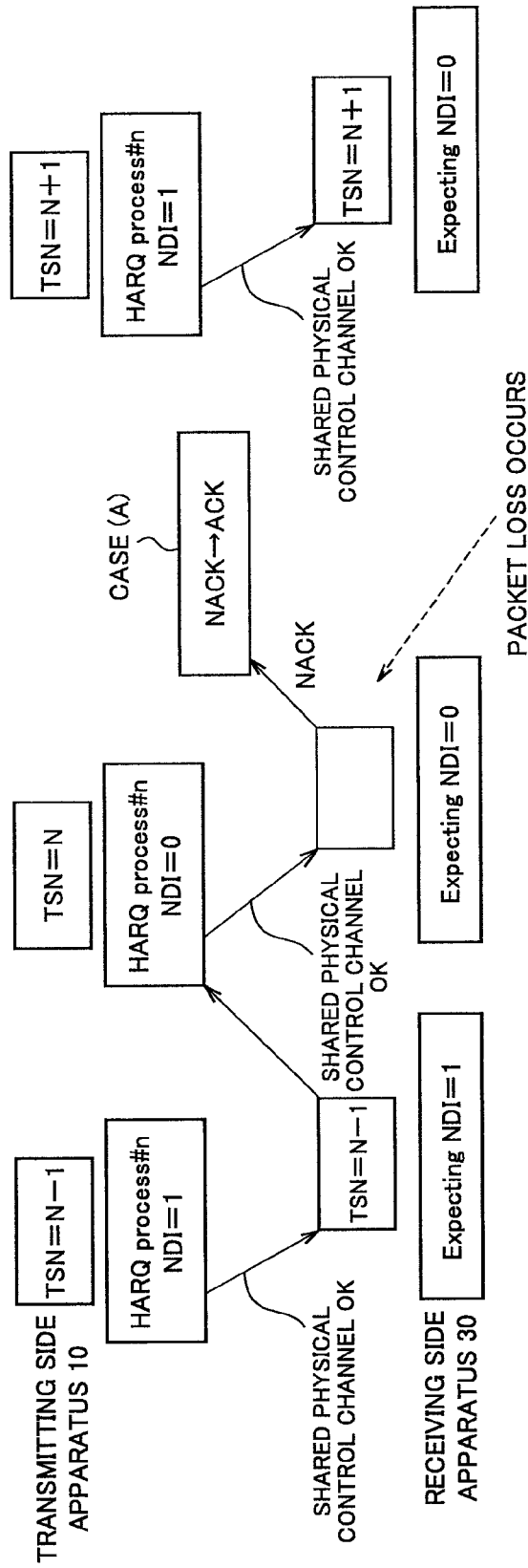
FIG. 5 is a diagram for explaining a problem in the retransmission control in the mobile communication system according to the conventional technique.
Figure 6:
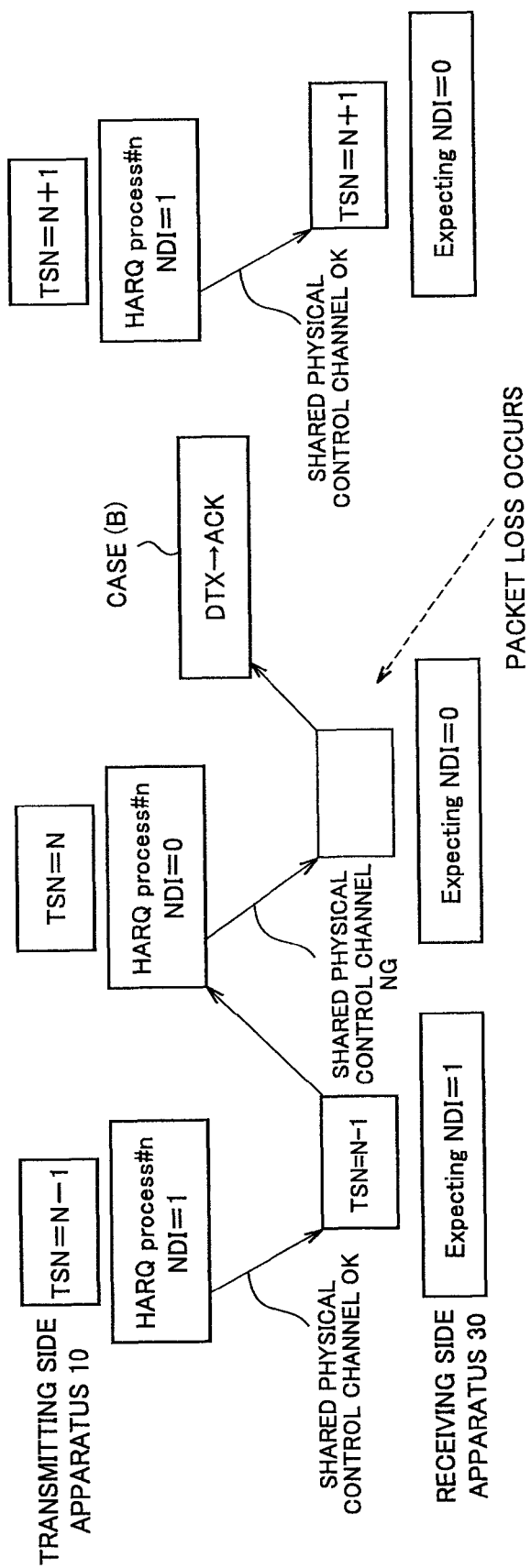
FIG. 6 is a diagram for explaining the problem in the retransmission control in the mobile communication system according to the conventional technique.
Figure 7:
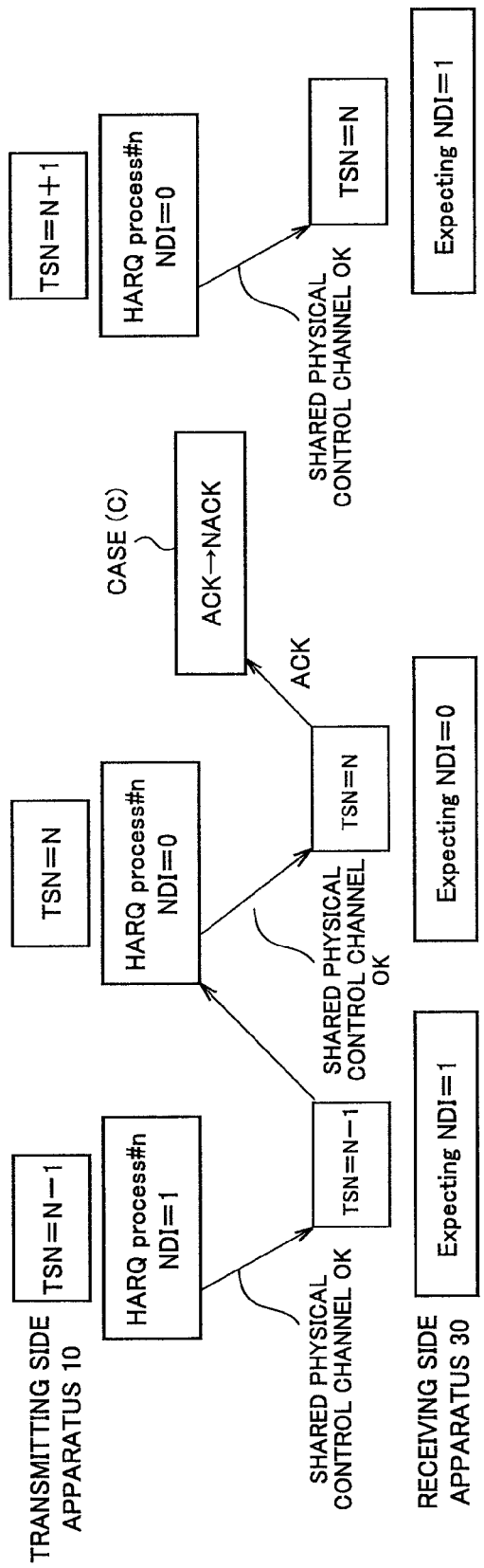
FIG. 7 is a diagram for explaining the problem in the retransmission control in the mobile communication system according to the conventional technique.
Figure 8:
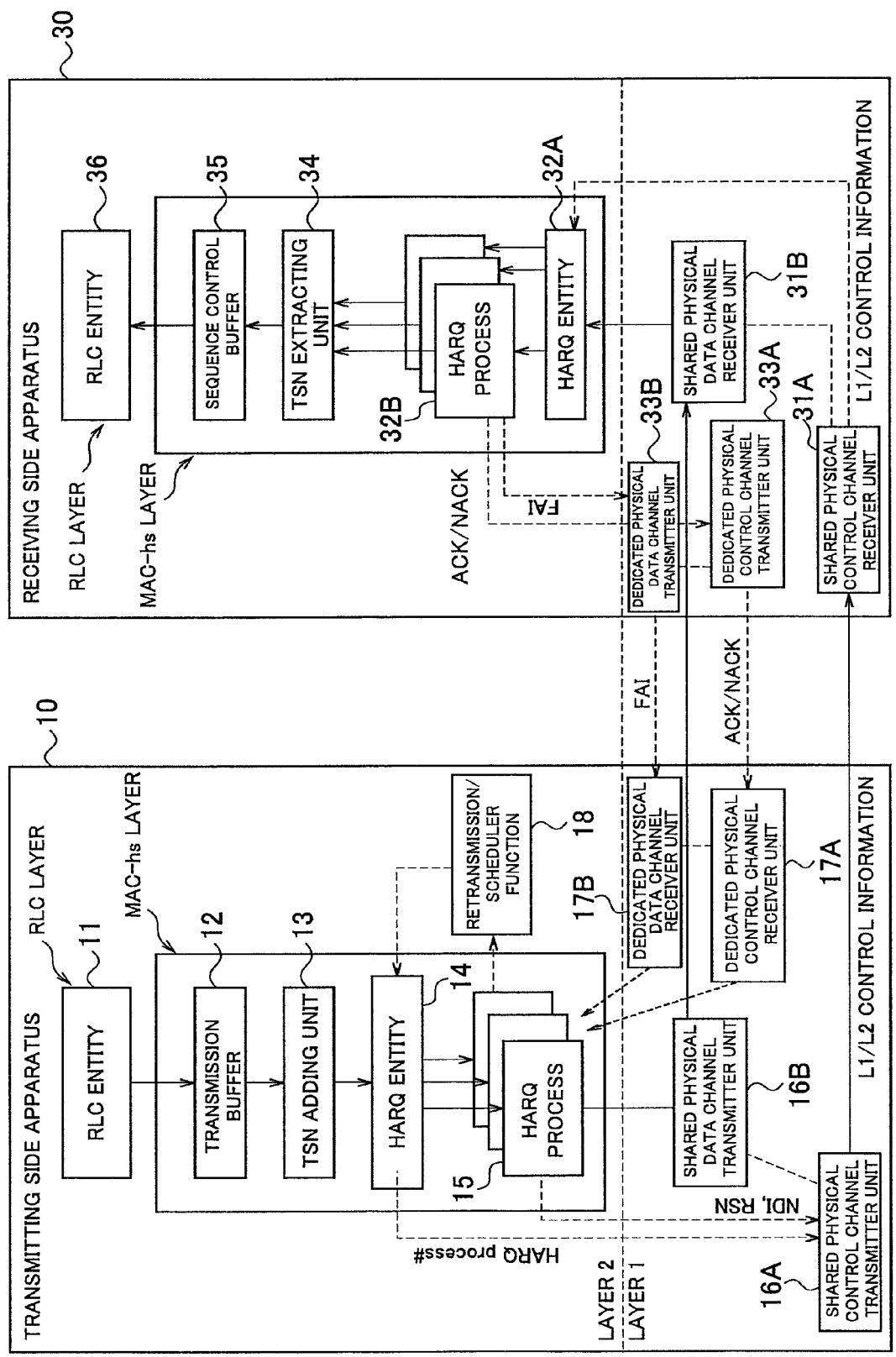
FIG. 8 is a functional block diagram of a transmitting side apparatus and a receiving side apparatus according to a first embodiment of the present invention.

As shown in FIG. 8, as a function of a layer 2, the transmitting side apparatus 10 includes an RLC entity 11, a transmission buffer 12, a TSN adding unit 13, an HARQ entity 14, multiple HARQ processes 15, and a retransmission/scheduler function 18. Additionally, as a function of a layer 1, the transmitting side apparatus 10 includes a shared physical control channel transmitter unit 16A, a shared physical data channel transmitter unit 16B, a dedicated physical control channel receiver unit 17, and a dedicated physical data channel receiver unit 17B.

The RLC entity 11 is configured to perform the above-described ARQ retransmission control. Note that the RLC entity 11 may be configured to perform the ARQ retransmission control for each packet, or may be configured to perform the ARQ retransmission control for each set of multiple packets.

The transmission buffer 12 is configured to temporarily store user data transmitted from the RLC entity 11, and to then transmit the user data to the TSN adding unit 13.

The TSN adding unit 13 is configured to generate the protocol data unit (packet) to be transmitted through the transport channel multiplexed on the shared physical data channel, by adding a header including a TSN, an error correction code (such as a CRC) and the like, to the user data transmitted from the transmission buffer 12.

The HARQ entity 14 is configured to allocate the HARQ process for transmitting each of the packets, in response to an instruction for an HARQ retransmission control, scheduling control or the like, from the retransmission/scheduler function 18.

Specifically, the HARQ entity 14 is configured to discard the user data stored in the transmission buffer 12, or to determine a packet to be transmitted (a new packet or a retransmission packet) in each transmission opportunity (each TTI in the above-described transport channel), in response to the instruction from the retransmission/scheduler function 18.

In addition, the HARQ entity 14 is configured to notify the shared physical control channel transmitter unit 16A of an "HARQ process #" which specifies the HARQ process to be used for transmitting the packet, in each transmission opportunity.

Each of the HARQ processes 15 is configured to instruct the shared physical data channel transmitter unit 16B to transmit a packet, when the HARQ entity 14 instructs the HARQ process 15 to transmit the packet (a new packet or a retransmission packet).

Moreover, each of the HARQ processes 15 is configured to update an NDI (new data indicator) when a new packet is transmitted, and to notify the shared physical control channel transmitter unit 16A of the NDI, in each transmission opportunity. Here, each of the HARQ processes 15 is configured not to update the NDI when a retransmission packet is transmitted in the corresponding transmission opportunity.

Moreover, each of the HARQ processes 15 is configured to notify the shared physical control channel transmitter unit 16A of an "RSN (Retransmission Sequence Number)" which indicates whether the transmission of the packet in the corresponding transmission opportunity is "first transmission" or "retransmission".

Moreover, each of the HARQ processes 15 is configured to set "0" as the RSN when the NDI is updated (in the case of "first transmission"), to increment the RSN by "1" when the packet is to be retransmitted in response to a received NACK, and not to increment the RSN when the packet is to be retransmitted due to the DTX state.

Here, each of the HARQ processes 15 is configured not to increment the RSN when retransmission is performed after the RSN has reached the maximum value (for example, after the RSN has reached "11" in the case where the RSN is configured of 2 bits).

Moreover, each of the HARQ processes 15 is configured to notify the retransmission/scheduler function 18 of transmission acknowledgement information (ACK/NACK) received by the dedicated physical control channel receiver unit 17A through the dedicated physical control channel.

Moreover, each of the HARQ processes 15 is configured to notify the retransmission/scheduler function 18 of transmission acknowledgment information (FAI (False ACK Indicator)) received by the dedicated physical data channel receiver unit 17B through the dedicated physical data channel.

The retransmission/scheduler function 18 is configured to perform the HARQ retransmission control and the scheduling control for each of the packets, on the basis of the transmission acknowledgment information (ACK/NACK/FAI) notified from the corresponding HARQ process 15.

The shared physical control channel transmitter unit 16A is configured to transmit the L1/L2 control information including the NDI and the HARQ process # notified from the HARQ entity 14, through a shared physical control channel (physical control channel). FIG. 9 shows an example of the L1/L2 control information transmitted through the shared physical control channel.

Here, the NDI (New Data Indicator) is configured of 1 bit, and is configured to be updated at the time of new packet transmission. For example, the NDI is configured to be updated so as to cyclically take two values "0" and "1", for example, "0"→"1"→"0". The initial value of the NDI may be "0" or "1".

Figure 9:
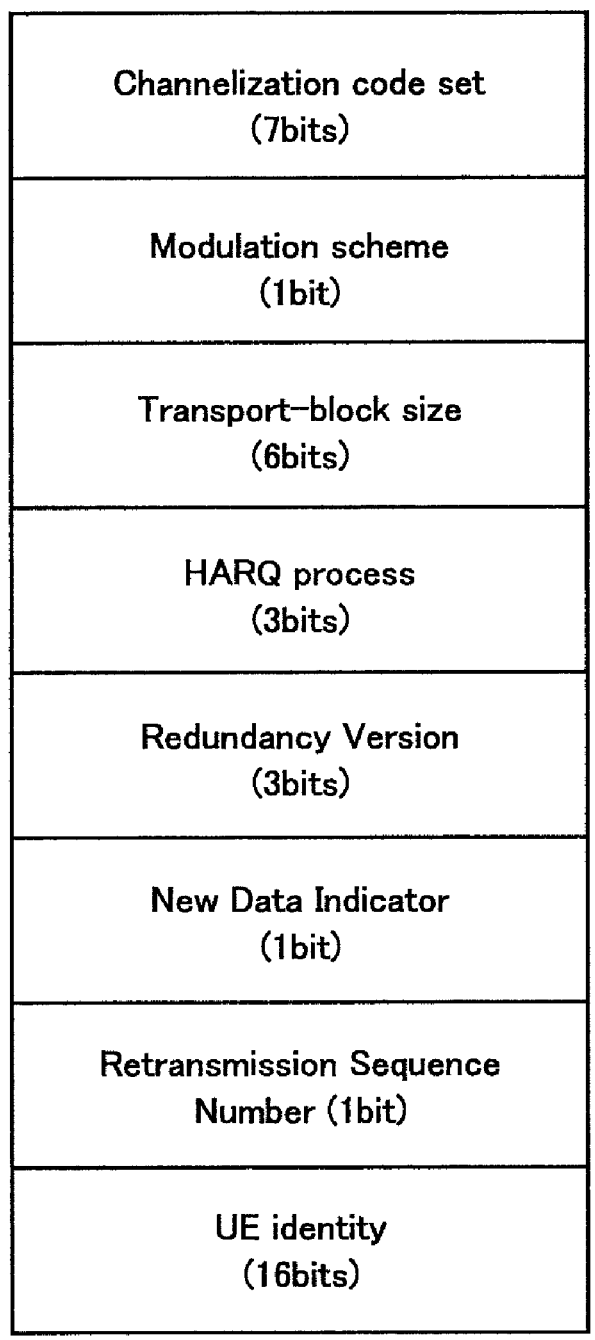
FIG. 9 is a diagram showing a format of a shared physical control channel used in a mobile communication system according to the first embodiment of the present invention.

The RSN may be configured of 1 bit as shown in FIG. 9, or multiple bits (for example, bits corresponding to the maximum number of retransmissions of the transmitting side apparatus 10).

The shared physical data channel transmitter unit 16B is configured to transmit the packet transmitted from each of the HARQ processes, at each TTI in the shared physical data channel (physical data channel). Note that the shared physical data channel is associated with the shared physical control channel.

The dedicated physical control channel receiver unit 17A is configured to receive transmission acknowledgement information such as ACK/NACK through the dedicated physical control channel (HARQ feedback physical channel), and to notify the corresponding HARQ process 15 of the transmission acknowledgement information.

Here, the dedicated physical control channel receiver unit 17A is configured to determine that the receiving side apparatus 30 is in the DTX state, when receiving no transmission acknowledgement information for each packet within a predetermined time period.

The dedicated physical data channel receiver unit 17B is configured to receive an MAC-PDU including transmission acknowledgement information such as an FAI, through the dedicated physical data channel, and to notify the corresponding HARQ process 15 of the transmission acknowledgement information.

Here, the FAI is a request for retransmission of a lost packet. Accordingly, when receiving a FAI, the retransmission/scheduler function 18 performs a control such that a predetermined packet (the packet transmitted at the last TTI, for example) would be retransmitted.

It should be noted that, although being configured to be transmitted through the dedicated physical data channel in this embodiment, the FAI may be configured to be transmitted through the dedicated physical control channel, the shared physical data channel, the shared physical control channel or the like.

Meanwhile, as shown in FIG. 8, the receiving side apparatus 30 includes a shared physical control receiver unit 31A, a shared physical data channel receiver unit 31B, an HARQ entity 32A, multiple HARQ processes 32B, a dedicated physical control channel transmitter unit 33A, a dedicated physical data channel transmitter unit 33B, a TSN extracting unit 34, a sequence control buffer 35, and an RLC entity 36.

The shared physical control channel receiver unit 31A is configured to receive L1/L2 control information from the transmitting side apparatus 10 through the shared physical control channel (physical control channel).

The shared physical control channel receiver unit 31A is configured to decode the L1/L2 control information transmitted through the shared physical control channel, and to then notify the HARQ entity 32A of the decoded L1/L2 control information.

The shared physical data channel receiver unit 31B is configured to transmit a packet transmitted through the shared physical data channel at each TTI, to the HARQ entity 32A on the basis of the L1/L2 control information transmitted through the shared physical control channel.

The HARQ entity 32A is configured to transmit the L1/L2 control information received from the shared physical control channel receiver unit 31A and the packet received from the shared physical data channel receiver unit 31B, to the corresponding HARQ process 32B.

Each of the HARQ processes 32B is configured to decode the packet transmitted from the HARQ entity 32A, on the basis of the L1/L2 control information transmitted from the HARQ entity 32A, and to then transmit the decoded packet to the TSN extracting unit 34.

In addition, each of the HARQ processes 32B is configured to generate transmission acknowledgement information (ACK/NACK) and then notify the dedicated physical control channel transmitter unit 33A of the transmission acknowledgement information, and to generate transmission acknowledgement information (FAI) and then notify the dedicated physical data channel transmitter unit 33B of the transmission acknowledgement information.

Specifically, each of the HARQ processes 32B is configured to generate transmission acknowledgement information (ACK/HACK/FAI), on the basis of the NDI included in the L1/L2 control information transmitted from the HARQ entity 32A (received NDI) and the RSN.

For example, each of the HARQ processes 32B is configured to transmit transmission acknowledgement information which indicates success of packet reception (ACK) at the last TTI (transmission opportunity) assigned to the corresponding HARQ process 32B. Here, each of the HARQ processes 32B is configured to generate transmission acknowledgement information (FAI) on the packet when the notified "NDI" is inconsistent with the "NDI expected to be received next (Expecting NDI)" and the notified "RSN" indicates "first transmission".

Moreover, each of the HARQ processes 32B is configured to transmit transmission acknowledgement information which indicates success of packet reception (ACK) at the last TTI (transmission opportunity) assigned to the corresponding HARQ process 32B. Here, each of the HARQ processes 32B is configured to generate transmission acknowledgement information (ACK) on the packet when the notified "NDI" is inconsistent with the "NDI expected to be received next (Expecting NDI)" and the notified "RSN" indicates "retransmission".

Moreover, each of the HARQ processes 32B is configured to transmit transmission acknowledgement information which indicates failure of packet reception (NACK) at the last TTI (transmission opportunity) assigned to the corresponding HARQ process 32B. Here, each of the HARQ processes 32B is configured to transmit transmission acknowledgement information (ACK/NACK) indicating the reception result of the packet, when the notified "NDI" is identical to the "NDI expected to be received next (Expecting NDI)" and the notified "RSN" indicates "first transmission".

Moreover, each of the HARQ processes 32B is configured to transmit transmission acknowledgement information which indicates failure of packet reception (NACK) at the last TTI (transmission opportunity) assigned to the corresponding HARQ process 32B. Here, each of the HARQ processes 32B is configured to transmit transmission acknowledgement information (FAI) indicating a request for retransmission of the lost packet, when the notified "NDI" is inconsistent with the "NDI expected to be received next (Expecting NDI)".

Here, the last TTI (transmission opportunity) and a current TTI (transmission opportunity) are assumed to be assigned to the same HARQ process 32B.

In this embodiment, the last TTI (transmission opportunity) and the current TTI (transmission opportunity) are recognized by each of the HARQ processes 32B. In Case (B) shown in FIG. 12, assuming that the transmission opportunity at which the packet "TSN=N+1" is transmitted is the current TTI, the transmission opportunity at which the packet "TSN=N−1" is transmitted is the last TTI. This is because the HARQ process #n fails to receive the L1/L2 control information transmitted through the shared physical control channel at the transmission opportunity where the packet "TSN=N" is transmitted and hence the HARQ process #n cannot recognize that the transmission opportunity is assigned to the HARQ process #n itself.

Here, each of the HARQ processes 32B is configured to update the Expecting NDI every time generating transmission acknowledgement information (ACK) for the packet.

Each of the HARQ processes 32B may be configured to discard a packet to the HARQ process 32B itself when receiving the packet before an elapse of an HARQ RTT (Round Trip Time).

Moreover, each of the HARQ processes 32B may be configured to discard a packet received at the current TTI when the NDI is not updated at the current TTI and the size of the packet (TBS: Transport Block Size) received at the current TTI is different from that of the packet received at the last TTI.

The dedicated physical control channel transmitter unit 33A is configured to transmit the transmission acknowledgment information (ACK/NACK) notified by each of the HARQ process 32B, through the dedicated physical control channel (HARQ feedback physical channel).

Note that, since the HARQ feedback physical channel needs to transmit at least two types of transmission acknowledgment information, at least 1 bit needs to be prepared in the HARQ feedback physical channel as a bit used for notifying the transmission acknowledgment information.

Moreover, the dedicated physical data channel transmitter unit 33B is configured to transmit the transmission acknowledgement information (FAI) notified from each of the HARQ processes 32B, through the dedicated physical data channel as an MAC-PDU.

The TSN extracting unit 34 is configured to extract the TSN of the packet transmitted by each of the HARQ processes. Moreover, the TSN extracting unit 34 is configured to sequentially store the packets into the sequence control buffer 35 on the basis of the extracted TSNs, so as to transmit the packets to the RLC entity 36 in the order of the TSNs.

The RLC entity 36 is configured to refer to the TSN of the packet transmitted from the sequence control buffer 35, and to perform the ARQ retransmission control for the packet. Note that the RLC entity 36 may be configured to perform the ARQ retransmission control for each packet, or may be configured to perform the ARQ retransmission control for each set of multiple packets.

(Operation of Mobile Communication System according to First Embodiment of Present Invention)

Operation of the mobile communication system according to this embodiment will be described below with reference to FIG. 10 to FIG. 13. Specifically, a description will be given of the retransmission control for the packet transmitted from a base station (process #n of the transmitting side apparatus 10) to a mobile station (process #n of the receiving side apparatus 30), in the mobile communication system according to this embodiment.

Figure 10:
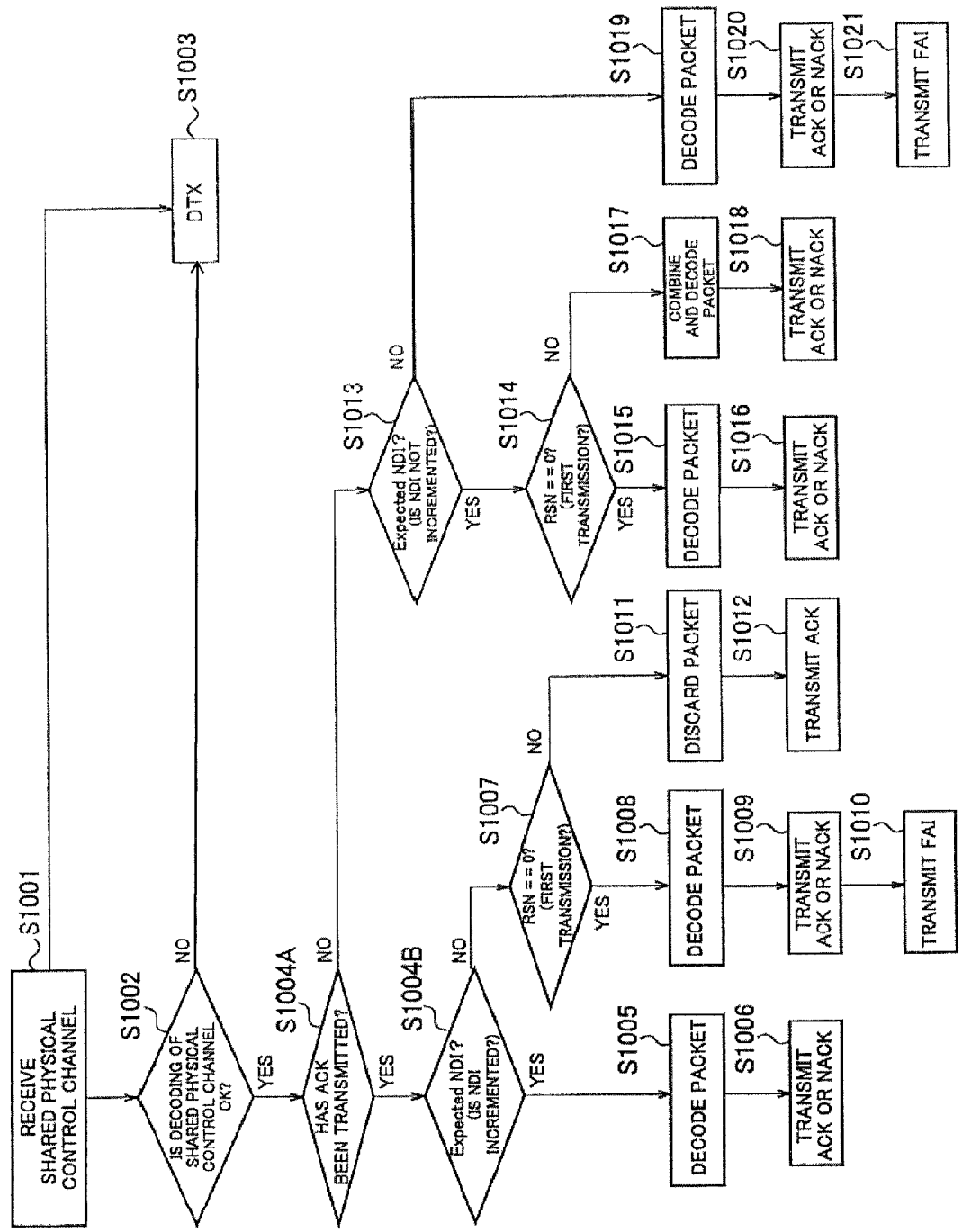
FIG. 10 is a flowchart showing operation of the receiving side apparatus according to the first embodiment of the present invention.

As shown in FIG. 10, in Step S1001, the mobile station receives L1/L2 control information transmitted from the base station through the shared physical control channel (the HS-SCCH, for example), at the current TTI assigned to the process #n.

In Step S1002, it is determined whether or not the reception and decoding of the L1/L2 control information transmitted through the shared physical control channel have been successful.

When the reception or decoding of the L1/L2 control information transmitted through the shared physical control channel has been failed, the mobile station goes into the DTX state in which no transmission acknowledgement information is transmitted through the HARQ feedback physical channel (the DPCCH, for example), in Step S1003.

On the other hand, when the reception and decoding of the L1/L2 control information transmitted through the shared physical control channel have been successful, the mobile station determines whether or not an ACK was transmitted at the last TTI assigned to the HARQ process #n, in Step S1004A. The operation advances to Step S1004B when it is determined that an ACK was transmitted, while advancing to Step S1013 when it is determined that an NACK was transmitted.

In Step S1004B, the mobile station determines whether or not the NDI received through the shared physical control channel (received NDI) is consistent with the NDI expected to be received next (Expecting NDI). In other words, the mobile station determines whether or not the "received NDI" is incremented (updated).

When it is determined that the "received NDI" is consistent with the "Expecting NDI", in other words, when it is determined that the "received NDI" is incremented (updated), the mobile station decodes the packet received through the shared physical data channel, on the basis of the L1/L2 control information received through the shared physical control channel, in Step S1005.

In Step S1006, the mobile station transmits transmission acknowledgement information (ACK/NACK) on the basis of the decoding result of the packet (reception result), through the HARQ feedback physical channel.

On the other hand, when it is determined that the "received NDI" is inconsistent with the "Expecting NDI", in other words, when it is determined that the "received NDI" is not incremented (not updated), the mobile station determines whether or not the "RSN" received through the shared physical control channel indicates "first transmission", in other words, whether or not the "RSN" is "0", in Step S1007.

Figure 12:
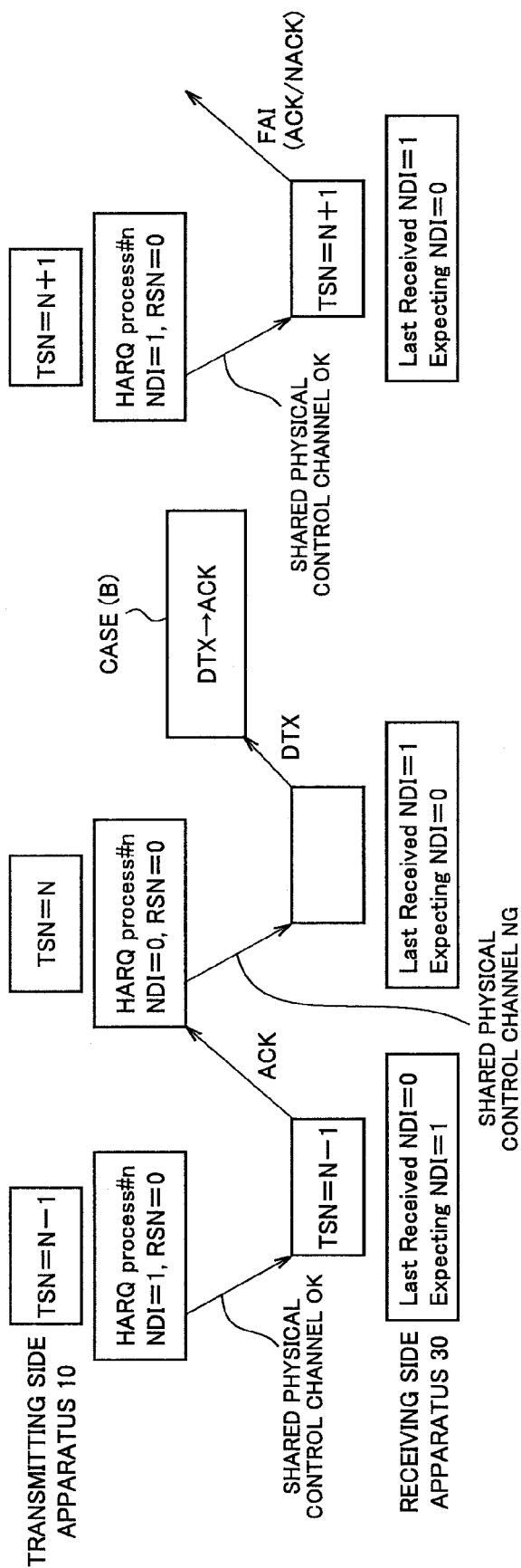
FIG. 12 is a diagram for explaining the retransmission control in the mobile communication system according to the first embodiment of the present invention.

When it is determined that the "RSN" indicates "first transmission" (in other words, when the "RSN" is "0"), the mobile station determines that a loss of the packet has occurred because reception of an ACK is falsely detected even when the mobile station is actually in the DTX state, in Step S1008 (Case (B) in FIG. 12). Accordingly, the mobile station decodes the packet received through the shared physical data channel, on the basis of the L1/L2 control information received through the shared physical control channel.

In Step S1009, the mobile station transmits the decoding result of the packet through the dedicated physical control channel. Then, in Step S1010, the mobile station transmits transmission acknowledgement information (FAI) for requesting retransmission of the lost packet (packet "TSN=N" in the example of FIG. 12), through the dedicated physical data channel.

Figure 13:
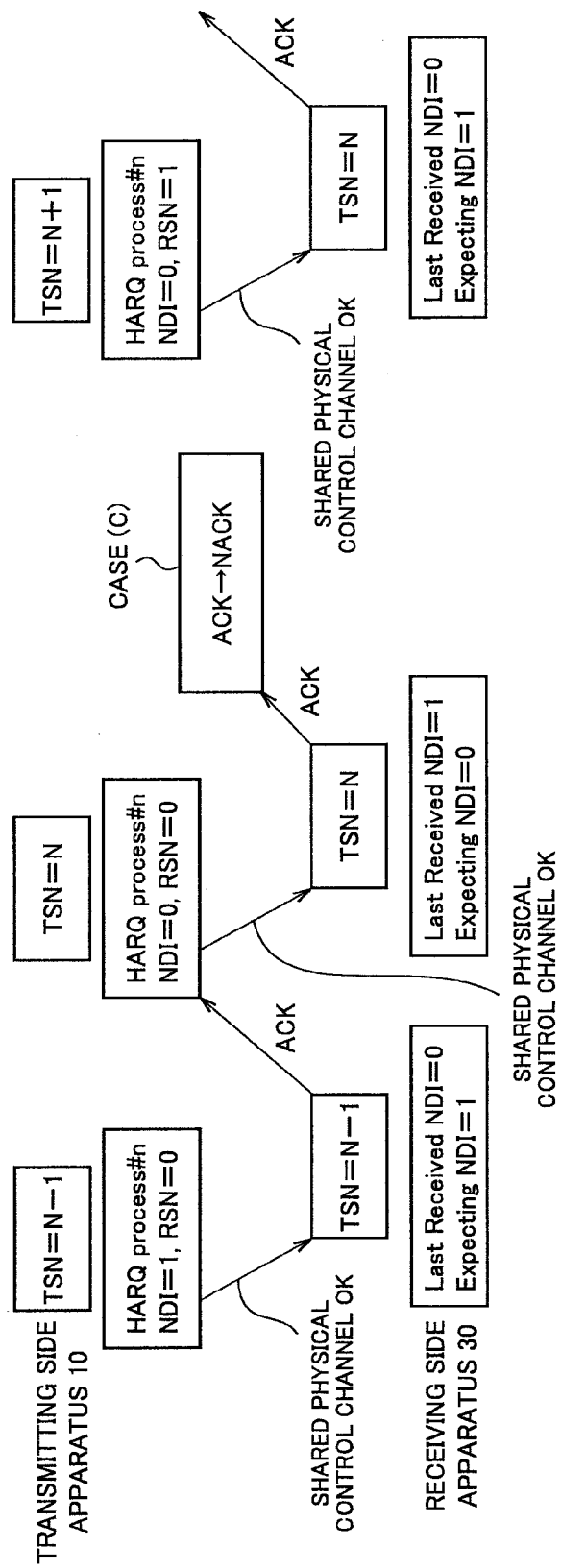
FIG. 13 is a diagram for explaining the retransmission control in the mobile communication system according to the first embodiment of the present invention.

On the other hand, when it is determined that the "RSN" indicates "retransmission" (in other words, when the "RSN" is other than "0"), the mobile station determines that the transmission is redundant retransmission arisen from false detection of an ACK as being an NACK (Case (C) in FIG. 13), in Step S1011. Then, in Step S1012, the mobile station transmits transmission acknowledgement information (ACK) through the dedicated physical control channel (HARQ feedback physical channel) regardless of the decoding result of the packet in the HARQ process #n.

In Step S1013, the mobile station determines whether or not the NDI received through the shared physical control channel (received NDI) is consistent with the NDI expected to be received next (Expecting NDI). In other words, the mobile station determines whether or not the "received NDI" is incremented (updated).

When it is determined that the "received NDI" is consistent with the "Expecting NDI", in other words, when it is determined that the "received NDI" is not incremented (not updated), the operation advances to Step S1014. When it is determined that the "received NDI" is inconsistent with the "Expecting NDI", in other words, when it is determined that the "received NDI" is incremented (updated), the operation advances to Step S1019.

In Step S1014, it is determined whether or not the "RSN" received through the shared physical control channel indicates "first transmission", in other words, whether or not the "RSN" is "0".

When it is determined that the "RSN" indicates "first transmission" (in other words, when the "RSN" is "0"), the mobile station decodes the packet included in the shared physical data channel, on the basis of the L1/L2 control information received through the shared physical control channel, in Step S1015.

In Step S1016, the mobile station transmits transmission acknowledgement information (ACK/NACK) through the HARQ feedback physical channel, on the basis of the decoding result (reception result) of the packet.

On the other hand, when it is determined that the "RSN" indicates "retransmission" (in other words, when the "RSN" is other than "0"), the mobile station decodes the packet included in the shared physical data channel, on the basis of the L1/L2 control information received through the shared physical control channel, in Step S1017.

In Step S1018, the mobile station transmits transmission acknowledgement information (ACK/NACK) through the HARQ feedback physical channel on the basis of the decoding result (reception result) of the packet.

Figure 11:
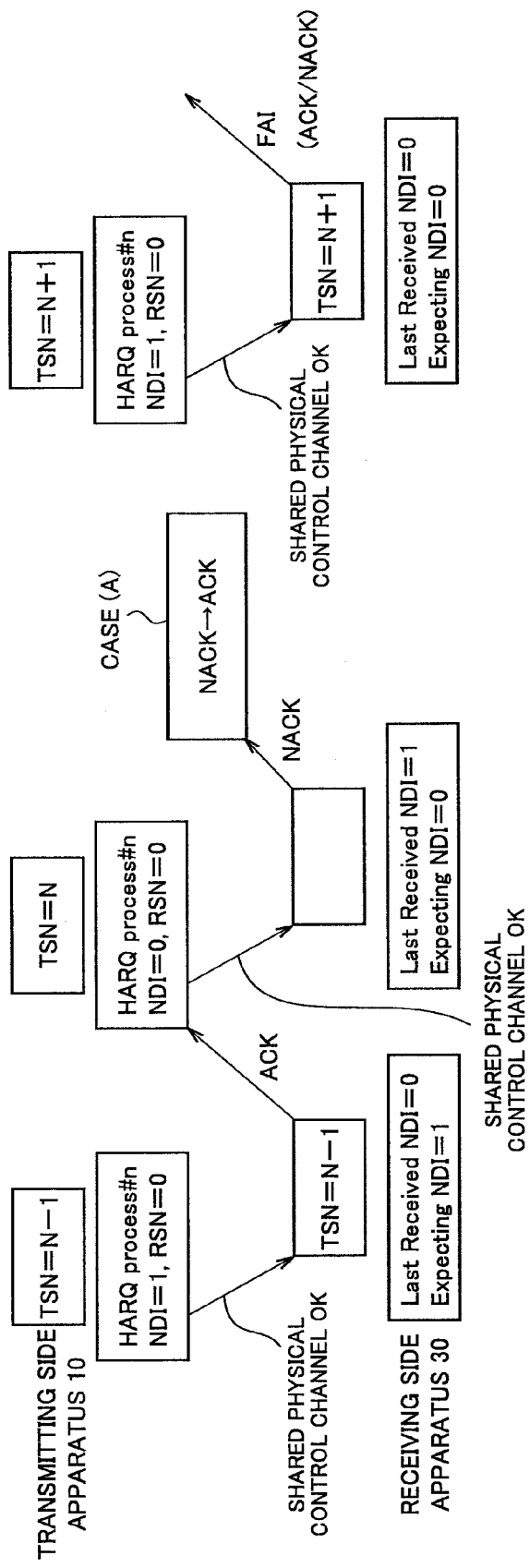
FIG. 11 is a diagram for explaining a retransmission control in the mobile communication system according to the first embodiment of the present invention.

In Step S1019, the mobile station determines that a loss of the packet has occurred due to false detection of an NACK as being an ACK (Case (A) in FIG. 11), and decodes the packet received through the shared physical data channel, on the basis of the L1/L2 control information received through the shared physical control channel.

The mobile station transmits the decoding result of the packet through the dedicated physical control channel in Step S1020, and transmits transmission acknowledgement information (FAI) for requesting retransmission of the lost packet (packet "TSN=N" in the example of FIG. 12) through the dedicated physical control channel in Step S1021.

(Effects and Advantages of Mobile Communication System according to First Embodiment of Present Invention)

The mobile communication system according to this embodiment is configured to detect a loss of a packet on the basis of the NDI and the RSN without waiting for the retransmission control in the RLC layer, and to transmit transmission acknowledgement information (FAI) regardless of a decoding result of a packet from each HARQ process. Accordingly, transmission delay can be suppressed.

(Mobile Communication System According to Second Embodiment of Present Invention)

The mobile communication system according to a second embodiment of the present invention will be described with reference to FIG. 14. A description will be given of the mobile communication system according to this embodiment below mainly with respect to differences from the above-described mobile communication system according to the first embodiment.

A configuration of the mobile communication system according to this embodiment is in conformity with a configuration based on the LTE (Long Term Evolution).

Here, a "PDSCH: Physical Downlink Shared Channel" is used as a downlink shared physical data channel, and a "PDCCH: Physical Downlink Control Channel" is used as a downlink shared physical control channel.

A "PUCCH: Physical Uplink Control Channel" is used as an uplink shared physical control channel, and a "PUSCH: Physical Uplink Shared Channel" is used as an uplink shared physical data channel.

A "DL-SCH: Downlink Shared Channel" is used as a transport channel multiplexed on the PDSCH, and a "UL-SCH: Uplink Shared Channel" is used as a transport channel multiplexed on the PUSCH.

Figure 14:
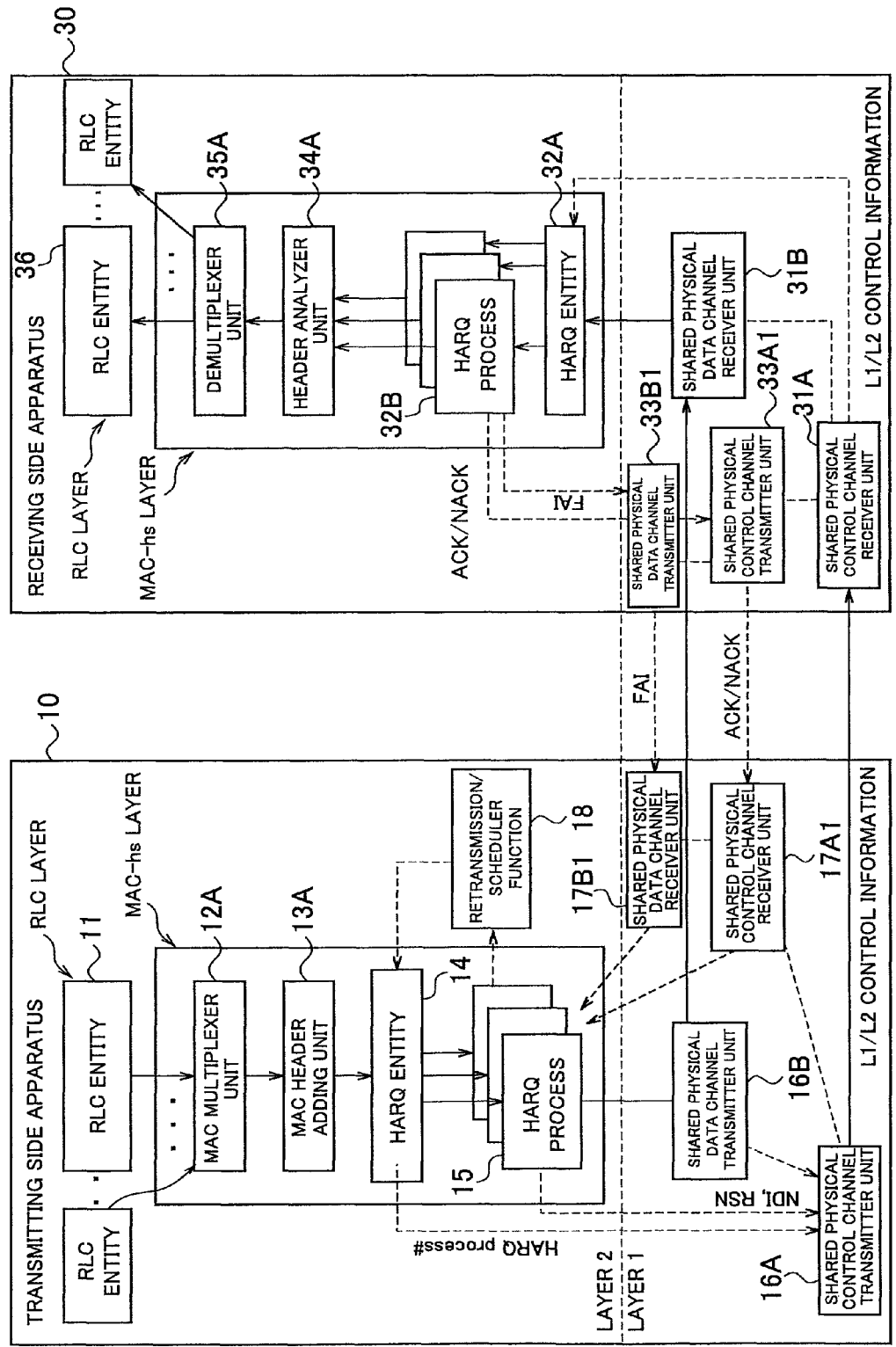
FIG. 14 is a functional block diagram of a transmitting side apparatus and a receiving side apparatus according to a second embodiment of the present invention.

As shown in FIG. 14, a transmitting side apparatus 10 includes multiple RLC entities 11 corresponding respectively to logical channels, and a receiving side apparatus 30 similarly includes multiple RLC entities 36 corresponding respectively to logical channels. The function of each of the RLC entities 11 and 36 is the same as that of corresponding one of the RLC entities 11 and 36 of the above-described first embodiment.

Moreover, the transmitting side apparatus 10 includes an MAC multiplexer unit 12A instead of a transmission buffer 12, an MAC header adding unit 13A instead of a TSN adding unit 13, a shared physical control channel receiver unit 17A1 instead of a dedicated physical control channel receiver unit 17A, and a shared physical data channel receiver unit 17B1 instead of a dedicated physical data channel receiver unit 17B.

Meanwhile, the receiving side apparatus 30 includes a header analyzer unit 34A instead of a TSN extracting unit 34, a demultiplexer unit 35A instead of a sequence control buffer 35, a shared physical control channel transmitter unit 33A1 instead of a dedicated physical control channel transmitter unit 33A, and a shared physical data channel transmitter unit 33B1 instead of a dedicated physical data channel transmitter unit 33B.

The MAC multiplexer unit 12A is configured to multiplex and temporarily store user data transmitted from the multiple RLC entities 11, and to then transmit the user data to the MAC header adding unit 13A.

The MAC header adding unit 13A is configured to generate a protocol data unit (packet) to be transmitted through the transport channel multiplexed on the shared physical data channel, by adding an MAC header, an error correction code (such as CRC) and the like, to the user data transmitted from the MAC multiplexer unit 12A.

The shared physical control channel receiver unit 17A1 is configured to receive transmission acknowledge information such as an ACK/NACK through the shared physical control channel (HARQ feedback physical channel), and to notify a corresponding HARQ process 15 of the transmission acknowledgement information.

Here, the shared physical control channel receiver unit 17A1 is configured to determine that the receiving side apparatus 30 is in a DTX state, when receiving no transmission acknowledgement information for each packet within a predetermined time period.

The shared physical control channel transmitter unit 33A1 is configured to transmit the transmission acknowledgement information (ACK/NACK) notified by each HARQ process 32B, through the shared physical control channel (HARQ feedback physical channel).

The header analyzer unit 34A is configured to analyze the header of a packet transmitted from each HARQ process 32B, and to store the packets in the demultiplexer unit 35A to transmit the packets respectively to the multiple RLC entities 36.

The demultiplexer unit 35A is configured to demultiplex the packets to the multiple RLC entities, and to transmit the packets respectively to the RLC entities 36.

It is to be noted that, although the FAI is configured to be transmitted through the shared physical data channel in this embodiment, the FAI may be configured to be transmitted through a dedicated physical control channel, a dedicated physical data channel or the shared physical control channel.

Moreover, although an ACK/NACK is configured to be transmitted through the uplink shared physical control channel associated with the downlink shared physical control channel, an ACK/NACK may be configured to be transmitted through the dedicated physical control channel.

The present invention has been described above in detail by using the above-described embodiments. However, it is obvious to those skilled in the art that the present invention is not limited to the embodiments described in the description of the present application. The present invention can be implemented as a modified or changed form without departing from the aim and the scope of the present invention determined by the description of the scope of claims. Thus, what is described in this description is intended to illustrate the present invention, and is not intended to impose any limitations on the present invention.

It is to be noted that the entire contents of Japanese Patent Application No. 2007-031384 (filed on Feb. 9, 2007) is incorporated into the description of the present application.

INDUSTRIAL APPLICABILITY

As described above, with the retransmission control method and the receiving side apparatus according to the present invention, a loss of a packet is promptly detected and a retransmission control is performed, when transmission acknowledgement information transmitted through an HARQ feedback physical channel is falsely detected in a transmitting side apparatus. Hence, transmission delay can be suppressed.

The invention claimed is:

1. A retransmission control method for performing a retransmission control for a packet transmitted from a transmitting side apparatus to a receiving side apparatus through a physical data channel, on the basis of transmission acknowledgment information on the packet, the retransmission control method comprising:

a physical control channel transmitting step of transmitting, at the transmitting side apparatus, a new data indicator updated upon transmission of a new packet, and a retransmission sequence number indicating whether transmission is first transmission or retransmission, through a physical control channel associated with the physical data channel; and a transmission acknowledgement information transmitting step of transmitting, at the receiving side apparatus, the transmission acknowledgment information on the packet received through the physical data channel, on the basis of the new data indicator and the retransmission sequence number received through the physical control channel, wherein, in the transmission acknowledgement information transmitting step, when the receiving side apparatus has transmitted the transmission acknowledgement information indicating a success of reception of a packet in a last transmission opportunity, when the new data indicator received through the physical control channel in a current transmission opportunity is different from that expected to be received next, and when the retransmission sequence number indicates first transmission, the receiving side apparatus transmits the transmission acknowledgement information indicating a request for retransmission of a lost packet, and wherein, in the transmission acknowledgement information transmitting step, when the receiving side apparatus has transmitted the transmission acknowledgement information indicating a success of reception of a packet in a last transmission opportunity, when the new data indicator received through the physical control channel in a current transmission opportunity is different from that expected to be received next, when the retransmission sequence number indicates retransmission, the receiving side apparatus transmits the transmission acknowledgement information indicating a success of reception of the packet.

2. The retransmission control method according to claim 1, wherein, in the transmission acknowledgement information transmitting step, when the receiving side apparatus has transmitted the transmission acknowledgement information indicating a failure of reception of a packet in a last transmission opportunity, when the new data indicator received through the physical control channel in a current transmission opportunity is identical to that expected to be received next, and when the retransmission sequence number indicates first transmission, the receiving side apparatus transmits the transmission acknowledgement information indicating a reception result of the packet.

3. The retransmission control method according to claim 2, wherein the last transmission opportunity and the current transmission opportunity are assigned to the same HARQ process.

4. The retransmission control method according to claim 1, wherein, in the transmission acknowledgement information transmitting step, when the receiving side apparatus has transmitted the transmission acknowledgement information indicating a failure of reception of a packet in a last transmission opportunity, and when the new data indicator received through the physical control channel in a current transmission opportunity is different from that expected to be received next, the receiving side apparatus transmits the transmission acknowledgement information indicating a request for retransmission of a lost packet.

5. The retransmission control method according to claim 1, wherein the last transmission opportunity and the current transmission opportunity are assigned to the same HARQ process.

* * * * *